United States Patent
Singh et al.

(10) Patent No.: US 9,967,174 B2
(45) Date of Patent: May 8, 2018

(54) DESIGNATED FORWARDER (DF) ELECTION BASED ON STATIC DF ELECTION PROCEDURE

(71) Applicant: Juniper Networks, Inc., Sunnyvale, CA (US)

(72) Inventors: Tapraj Singh, San Ramon, CA (US); Selvakumar Sivaraj, Sunnyvale, CA (US); Sunesh Rustagi, San Jose, CA (US); John E. Drake, Pittsburgh, PA (US)

(73) Assignee: Juniper Networks, Inc., Sunnyvale, CA (US)

( * ) Notice: Subject to any disclaimer, the term of this patent is extended or adjusted under 35 U.S.C. 154(b) by 120 days.

(21) Appl. No.: 15/010,538

(22) Filed: Jan. 29, 2016

(65) Prior Publication Data
US 2017/0141998 A1    May 18, 2017

Related U.S. Application Data

(60) Provisional application No. 62/254,323, filed on Nov. 12, 2015.

(51) Int. Cl.
| | |
|---|---|
| *H04L 12/28* | (2006.01) |
| *H04L 12/761* | (2013.01) |
| *H04L 12/18* | (2006.01) |
| *H04L 12/703* | (2013.01) |
| *H04L 12/715* | (2013.01) |

(52) U.S. Cl.
CPC ............ *H04L 45/16* (2013.01); *H04L 12/18* (2013.01); *H04L 45/04* (2013.01); *H04L 45/28* (2013.01)

(58) Field of Classification Search
CPC combination set(s) only.
See application file for complete search history.

(56) References Cited

U.S. PATENT DOCUMENTS

| | | | |
|---|---|---|---|
| 7,227,838 B1 | 6/2007 | O'Riordan | |
| 8,665,883 B2 * | 3/2014 | Balus | H04L 12/4641 370/395.53 |
| 8,867,367 B2 * | 10/2014 | Allan | H04L 45/66 370/238 |

(Continued)

FOREIGN PATENT DOCUMENTS

WO        2014/131350        9/2014

OTHER PUBLICATIONS

Sajassi et al, BGP MPLS-Based Ethernet VPN, Request for Comments: 7432, 56 pages, Feb. 2015.*

(Continued)

*Primary Examiner* — Frank Duong
(74) *Attorney, Agent, or Firm* — Harrity & Harrity, LLP (57) ABSTRACT

A device may transmit, to one or more network devices of a portion of a network, information indicating that the device is configured to perform a static designated forwarder election procedure. The device may determine that the one or more network devices of the portion of the network are each configured to perform the static designated forwarder election procedure. The device may enable a static designated forwarder configuration of the device based on determining that the one or more network devices of the portion of the network are each configured to perform the static designated forwarder election procedure.

20 Claims, 6 Drawing Sheets

(56) References Cited

U.S. PATENT DOCUMENTS

| 8,988,984 B2* | 3/2015 | Marques | H04L 45/04 |
| | | | 370/219 |
| 9,031,070 B2* | 5/2015 | Mentze | H04L 45/122 |
| | | | 370/238 |
| 2012/0201124 A1 | 8/2012 | Marques et al. | |
| 2016/0134525 A1* | 5/2016 | Zhang | H04L 12/6418 |
| | | | 370/392 |

OTHER PUBLICATIONS

Kothari et al, BGP based Multi-homing in Virtual Private LAN Service, Internet Draft, 19 pages, Nov. 2009.*

Sajassi et al., "BGP MPLS-Based Ethernet VPN", https://tools.ietf.org/html/rfc7432, Feb. 2015, 112 pages.

Extended European Search Report corresponding to EP 16 19 4009.3, dated Apr. 19, 2017, 8 pages.

* cited by examiner

DESIGNATED FORWARDER (DF) ELECTION BASED ON STATIC DF ELECTION PROCEDURE

RELATED APPLICATION(S)

This application claims priority under 35 U.S.C. § 119 to U.S. Provisional Patent Application No. 62/254,323, filed on Nov. 12, 2015, the content of which is incorporated by reference herein in its entirety.

BACKGROUND

A set of routers may perform a designated forwarder (DF) election procedure utilizing multiple parameters associated with the set of routers, such as a parameter identifying a location of each router of the set of routers within a portion of a network, a parameter identifying an Internet protocol address of each router of the set of routers, or the like. A router, of the set of routers, may be selected as the designated forwarder for a portion of the network (e.g., an Ethernet segment, an Ethernet virtual private network instance, or the like) based on the set of routers performing the designated forwarder election procedure. The router may route one or more packets based on being selected as the designated forwarder for the portion of the network. For example, the router may forward multicast packets from an upstream position in the portion of the network to another router located at a downstream position in the portion of the network.

SUMMARY

According to some possible implementations, a device may include one or more processors. The one or more processors may transmit, to one or more network devices of a portion of a network, information indicating that the device is configured to perform a static designated forwarder election procedure. The one or more processors may determine that the one or more network devices of the portion of the network are each configured to perform the static designated forwarder election procedure. The one or more processors may enable a static designated forwarder configuration of the device based on determining that the one or more network devices of the portion of the network are each configured to perform the static designated forwarder election procedure.

According to some possible implementations, a non-transitory computer-readable medium may store one or more instructions, that, when executed by the one or more processors, may cause the one or more processors to determine that each network device, of a particular portion of a network, is configured to perform a static designated forwarder election procedure to select a designated forwarder for the particular portion of the network. The one or more instructions, when executed by the one or more processors, may cause the one or more processors to perform the static designated forwarder election procedure to select the designated forwarder for the particular portion of the network based on determining that each network device, of the particular portion of the network, is configured to perform the static designated forwarder election procedure.

According to some possible implementations, a method may include detecting, by a device, a trigger to exchange one or more messages with another device. The method may include exchanging, by the device, the one or more messages with the other device based on detecting the trigger to exchange the one or more messages with the other device. The method may include selectively performing, by the device, a static designated forwarder election procedure based on exchanging the one or more messages with other device. The method may include performing, by the device, routing of network traffic based on selectively performing the static designated forwarder election procedure.

DETAILED DESCRIPTION

The following detailed description of example implementations refers to the accompanying drawings. The same reference numbers in different drawings may identify the same or similar elements.

A network may include a set of network devices associated with routing network traffic. For example, the network may include a set of provider edge network devices (e.g., a set of provider edge routers) that receive traffic from a set of customer edge network devices (e.g., a set of customer edge routers) and route the traffic via the network. The set of provider edge network devices may perform a dynamic designated forwarder election procedure to select one or more provider edge network devices as designated forwarders for the network, non-designated forwarders for the network (e.g., backup designated forwarders for the network), or the like. The dynamic designated forwarder election procedure may include processing multiple parameters associated with the set of provider edge network devices, such as performing a set of modulo operations on provider edge network device identifiers (e.g., Internet protocol (IP) addresses), a set of hash operations on provider edge network device identifiers, or one or more other operations on one or more other parameters.

However, the dynamic designated forwarder election procedure may be computationally intense for networks with increasing quantities of provider edge network devices, Ethernet virtual private network (EVPN) instances (EVIs), Ethernet segments, or the like. Moreover, dynamically selecting a designated forwarder based on multiple parameters may limit an ability of a user to determine which provider edge network device, of a set of provider edge network devices, will be selected as the designated forwarder for a particular portion of a network and which provider edge network device, of the set of provider edge network devices, will be selected as a non-designated forwarder for the particular portion of the network. Implementations, described herein, may utilize a static designated forwarder election procedure to select a network device as a designated forwarder for a portion of a network. In this way, processing resources associated with performing designated forwarder election may be reduced relative to a dynamic designated forwarder election procedure. Moreover, based on statically configuring network devices as designated forwarders for a network, a user may exercise greater control over network operations and performance relative to the user being unable to determine which network devices are selected as designated forwarders for the network.

Figure 1A:
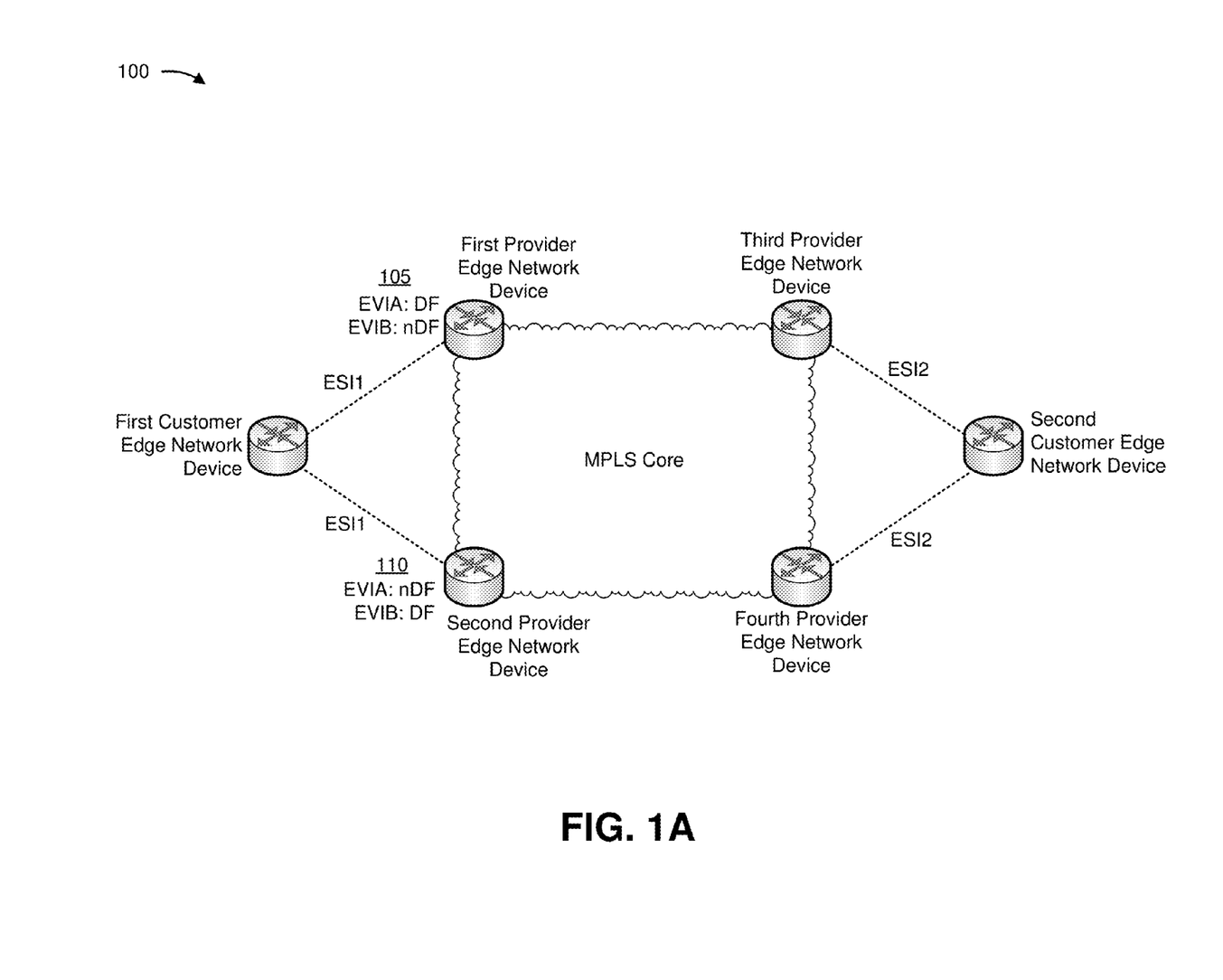
FIGS. 1A-1C are diagrams of an overview of an example implementation described herein.
Figure 1B:
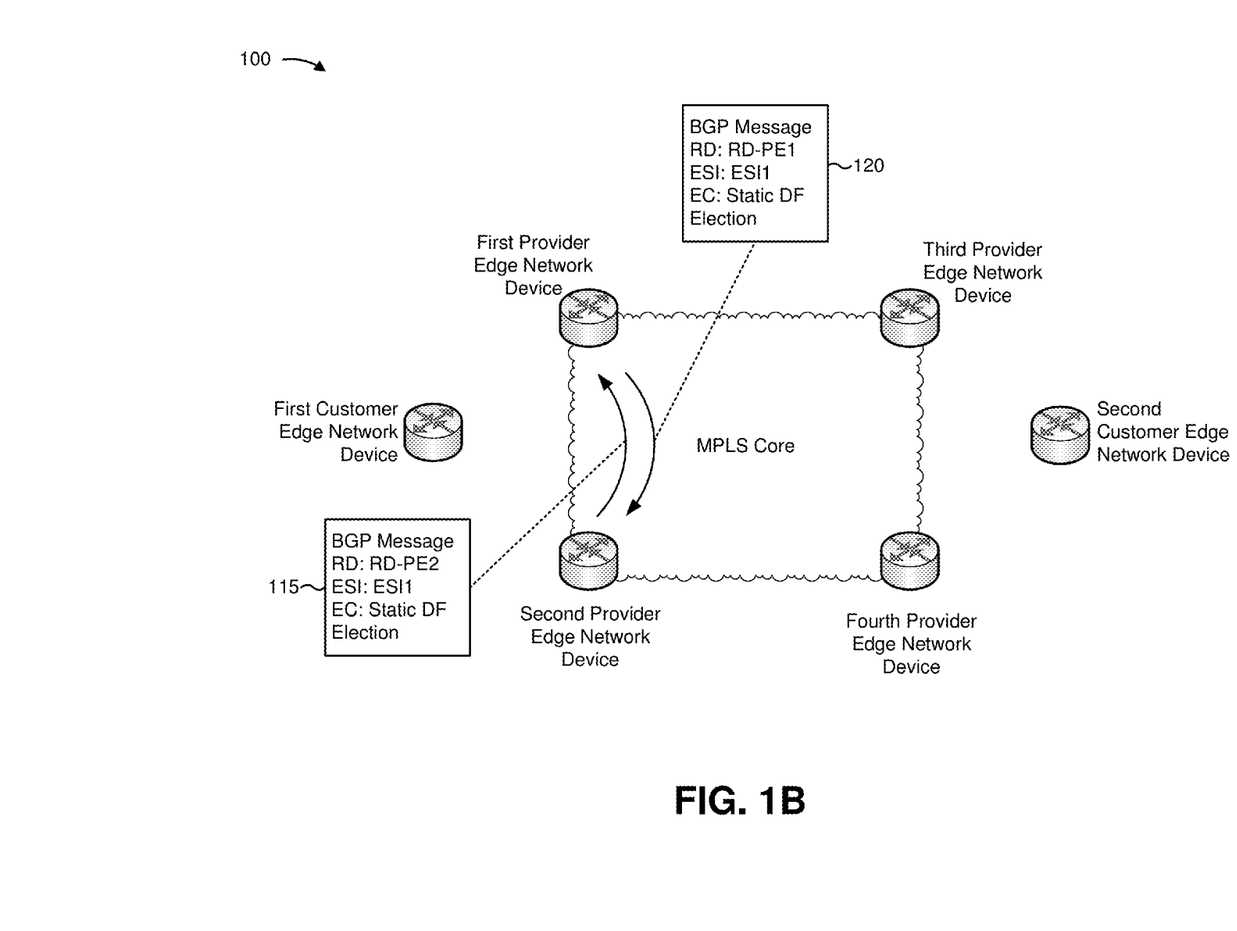
Figure 1C:
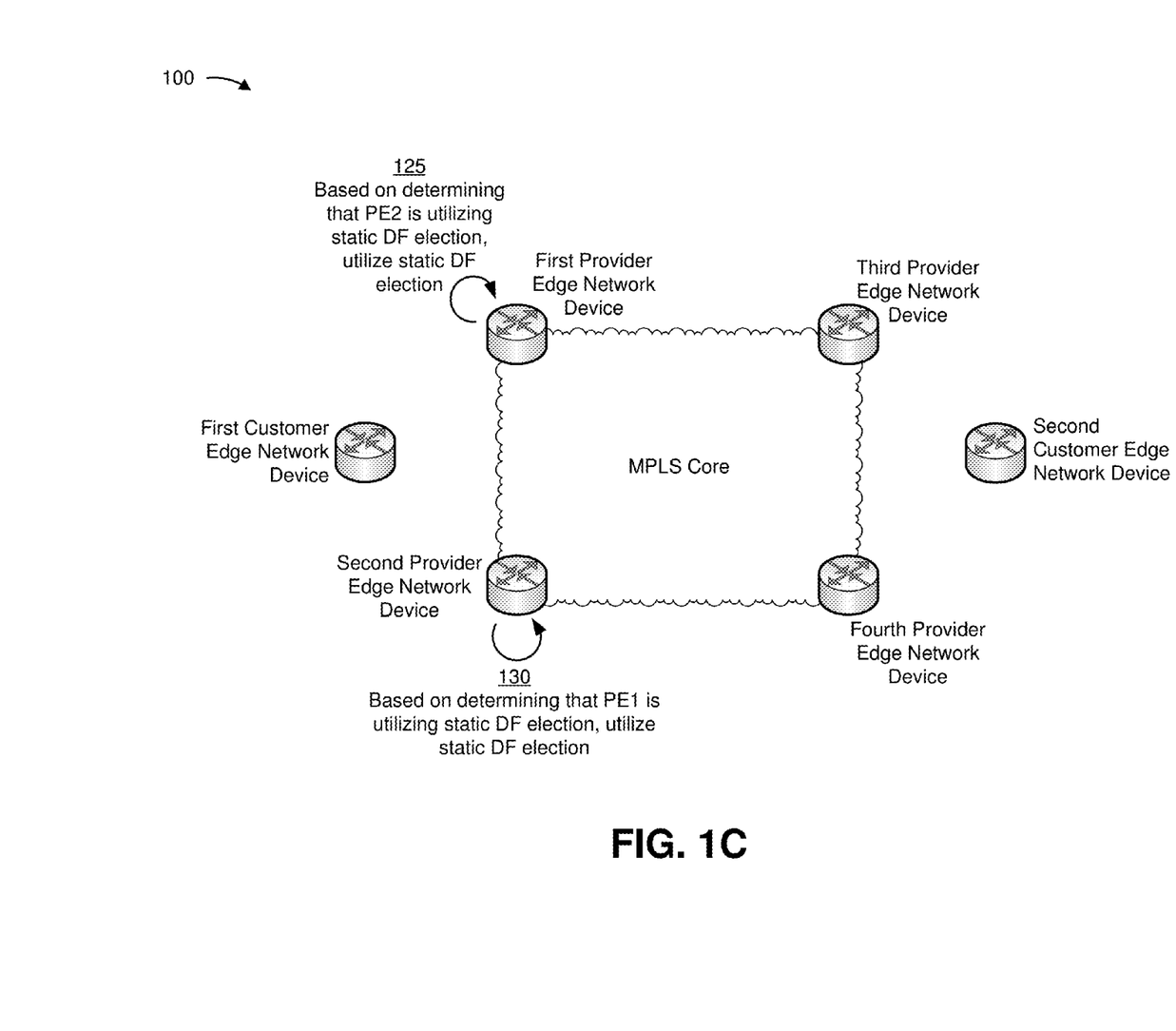

FIGS. 1A-1C are diagrams of an overview of an example implementation 100 described herein. As shown in FIG. 1A, example implementation 100 may include a multiprotocol label switching (MPLS) core network with a set of provider edge network devices (e.g., a first provider edge network device, a second provider edge network device, a third provider edge network device, and a fourth provider edge network device). The first provider edge network device and the second provider edge network device may connect to a first customer edge network device (e.g., a multi-homed network device) as a first Ethernet segment (e.g., identified as ESI1). Similarly, the third provider edge network device and the fourth provider edge network device may connect to a second customer edge network device as a second Ethernet segment (e.g., identified as ESI2).

As further shown in FIG. 1A, and by reference number 105, the first provider edge network device is statically configured as a designated forwarder (DF) for a first EVPN instance (e.g., identified by EVIA) and as a non-designated forwarder (nDF) for a second EVPN instance (e.g., identified by EVIB) of the first Ethernet segment. The first provider edge network device may store information identifying the static configuration. The first EVPN instance may connect a first set of virtual local area networks (VLANs) associated with the first customer edge network device with the MPLS core (e.g., via the first Ethernet segment). Similarly, the second EVPN instance may connect a second set of VLANs associated with the first customer edge network device with the MPLS core. As shown by reference number 110, the second provider edge network device is statically configured as a non-designated forwarder (nDF) for the first EVPN instance and a designated forwarder (DF) for the second EPVN instance. The second provider edge network device may store information identifying the static configuration.

As shown in FIG. 1B, and by reference number 115, the second provider edge network device may transmit information to the first provider edge network device. For example, the second provider edge network device may detect a trigger to transmit the information, such as being activated, determining that a network device has been added to the MPLS core, determining that a network device has been removed from the MPLS core, or the like, and may generate a border gateway protocol (BGP) message. The BGP message may include information identifying the second provider edge network device (e.g., a route distinguisher, RD: RD-PE2), information identifying the first Ethernet segment (e.g., ESI: ESI1), and an extended community portion that indicates that the second provider edge network device is configured to utilize a static designated forwarder election procedure (e.g., EC: Static DF Election).

As further shown in FIG. 1B, and by reference number 120, the first provider edge network device may transmit information to the second provider edge network device. For example, the first provider edge network device may detect a trigger to transmit the information, and may generate a BGP message. The BGP message may include information identifying the first provider edge network device (e.g., RD: RD-PE1), information identifying the first Ethernet segment (e.g., ESI: ESI1), and an extended community portion that indicates that the first provider edge network device is configured to utilize the static designated forwarder election procedure (e.g., EC: Static DF Election).

As shown in FIG. 1C, and by reference number 125, based on determining that the second provider edge network device is configured to utilize the static designated forwarder election procedure, the first provider edge network device performs the static designated forwarder election procedure. For example, the first provider edge network device obtains the stored information indicating that the first provider edge network device is to be a designated forwarder for the first EVPN instance (EVIA) and a non-designated forwarder for the second EVPN instance (EVIB). Similarly, as shown by reference number 130, based on determining that the first provider edge network device is configured to utilize the static designated forwarder election procedure, the second provider edge network device performs the static designated forwarder election procedure and is a designated forwarder for the second EVPN instance (EVIB) and a non-designated forwarder for the first EVPN instance (EVIA). In another example, when a network device of an Ethernet segment and an EVPN instance is not configured to utilize a static designated forwarder election procedure, each network device of the Ethernet segment and the EVPN instance may utilize a dynamic designated forwarder election procedure, thereby ensuring compatibility with legacy network devices.

In this way, a network device (e.g., a provider edge router) performs a static designated forwarder election procedure based on determining that each other network device of a common portion of a network is also configured to perform the static designated forwarder election procedure, thereby reducing a likelihood of multiple network devices selecting different designated forwarders relative to performing a dynamic designated forwarder election procedure. Moreover, the network device reduces a quantity of processing resources that must be assigned to perform designated forwarder election and improves predictability by a user (e.g., predictability of which network device will be selected as a designated forwarder) relative to a dynamic designated forwarder election procedure, thereby improving network performance.

As indicated above, FIGS. 1A-1C are provided merely as an example. Other examples are possible and may differ from what was described with regard to FIGS. 1A-1C.

Figure 2:
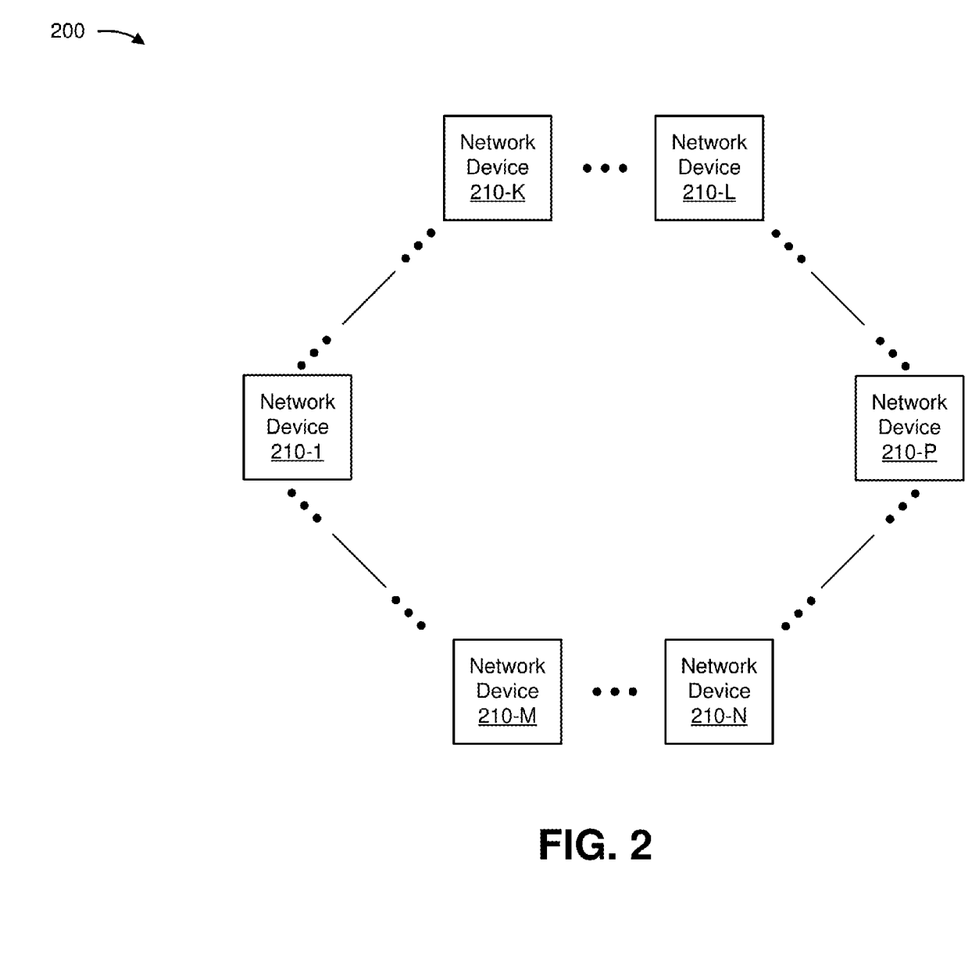
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more network devices 210-1 through 210-P (P≥1) (hereinafter referred to collectively as "network devices 210," and individually as "network device 210") and one or more networks. Devices of environment 200 may interconnect via wired connections, wireless connections, or a combination of wired and wireless connections.

Network device 210 may include one or more devices (e.g., one or more traffic transfer devices) capable of processing and/or transferring traffic between endpoint devices. For example, network device 210 may include a firewall, a router, a gateway, a switch, a hub, a bridge, a reverse proxy, a server (e.g., a proxy server), a load balancer, or a similar device. In some implementations, network device 210 may include a traffic transfer device associated with providing and/or receiving information via border gateway protocol (BGP). For example, in some implementations, network device 210 may include a provider edge router (e.g., a PE), a customer edge router (e.g., a CE), a route reflector network device, a peer device, an autonomous system boundary router, or the like.

Network device 210 may be associated with one or more networks, in some implementations. Similarly, a network, of the one or more networks, may include one or more network devices 210. In some implementations, the one or more networks may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
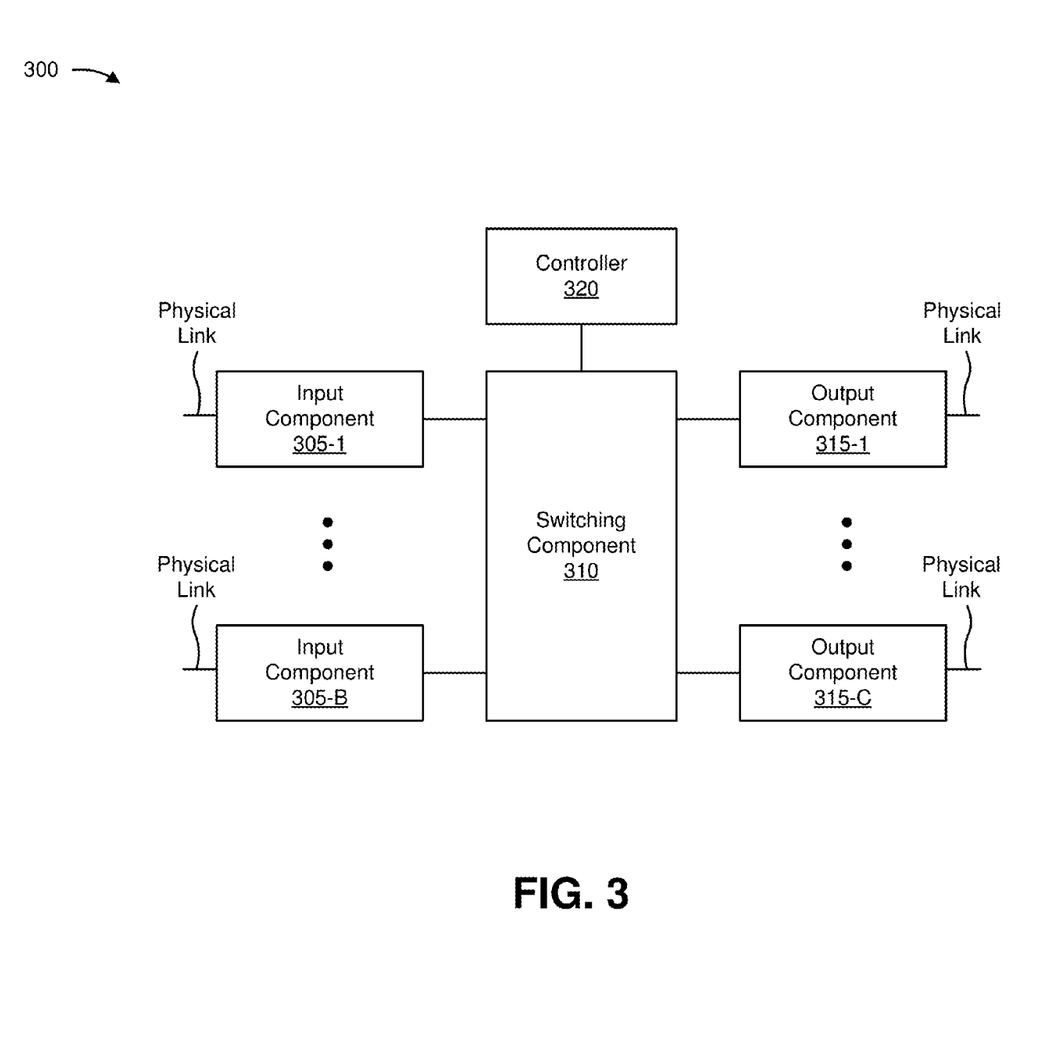
FIG. 3 is a diagram of example components of one or more devices of FIG. 2.

As shown in FIG. 3, device 300 may include a set of input components 305-1, ... 305-B (B≥1) (referred to individually as input component 305 and collectively as input components 305), a switching component 310, a set of output components 315-1, ..., 315-C (C≥1) (referred to individually as output component 315 and collectively as output components 315), and a controller 320. Components of device 300 may interconnect via wired connections, wireless connections, or a combination of wired and wireless connections.

Input component 305 may be a point of attachment for a physical link connected to device 300, and may be a point of entry for incoming traffic (e.g., packets) received by device 300. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues.

Switching component 310 may interconnect input components 305 and output components 315. In some implementations, switching component 310 may be implemented via one or more crossbars, via one or more busses, and/or using shared memory. The shared memory may act as a temporary buffer to store packets from input components 305 before the packets are eventually scheduled for delivery to output components 315. In some implementations, switching component 310 may enable input components 305, output components 315, and/or controller 320 to communicate.

Output component 315 may be a point of attachment for a physical link connected to device 300, and may be a point of exit for outgoing traffic (e.g., packets) transmitted by device 300. Output component 315 may store packets and/or may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, input component 305 and output component 315 may be implemented by the same set of components (i.e., an input/output component may be a combination of input component 305 and output component 315).

Controller 320 includes a processor in the form of, for example, a central processing unit (CPU), a microprocessor, a field-programmable gate array (FPGA), an application-specific integrated circuit (ASIC), and/or another type of processor that can interpret and/or execute instructions. Controller 320 is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, may create forwarding tables based on the routing tables, and may forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or a storage component associated with controller 320 from another computer-readable medium or from another device via a communication interface. When executed, software instructions stored in a memory and/or a storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
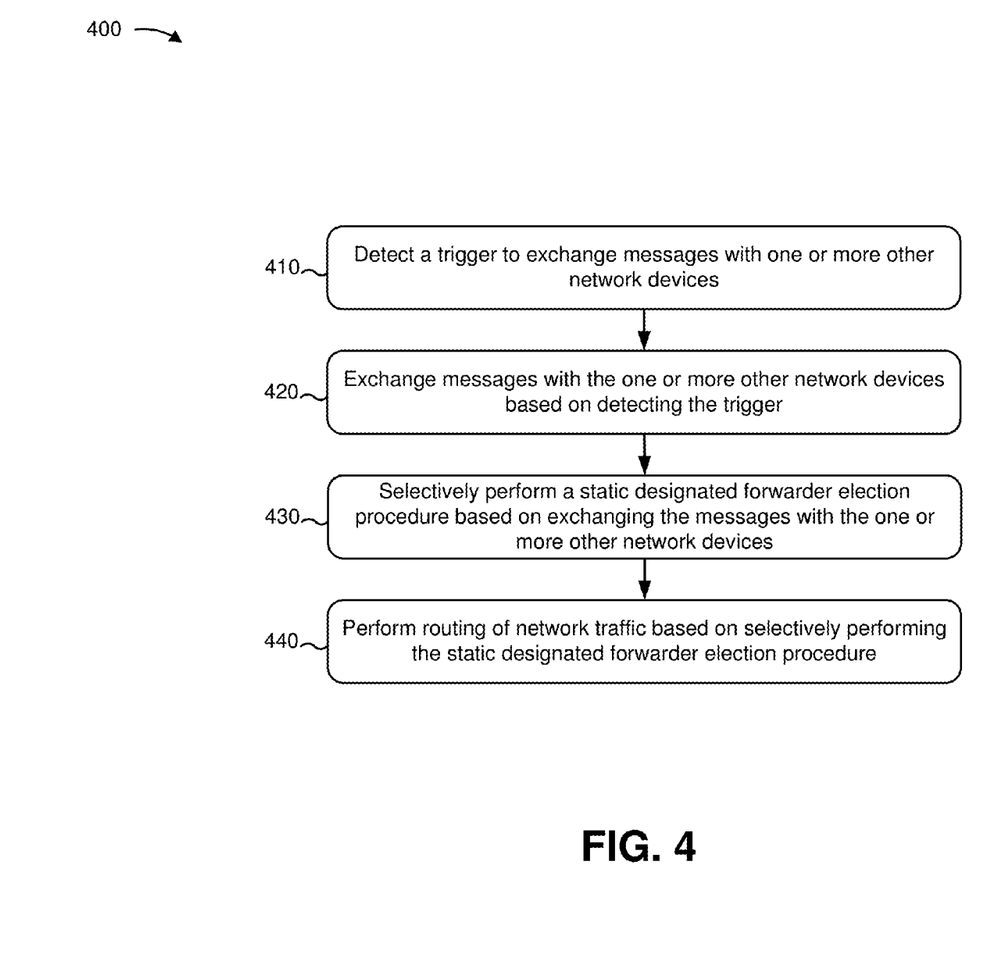
FIG. 4 is a flow chart of an example process for utilizing a static designated forwarder election procedure to configure routing of network traffic.

FIG. 4 is a flow chart of an example process 400 for utilizing a static designated forwarder election procedure to configure routing of network traffic. In some implementations, one or more process blocks of FIG. 4 may be performed by network device 210. In some implementations, one or more process blocks of FIG. 4 may be performed by another device or a group of devices separate from or including network device 210.

As shown in FIG. 4, process 400 may include detecting a trigger to exchange messages with one or more other network devices (block 410). For example, network device 210 may detect the trigger to exchange messages (e.g., to transmit a message, to receive a message, or the like) with one or more network devices 210. In some implementations, network device 210 may be triggered to exchange the messages based on being activated for utilization in a network. For example, network device 210 may determine that network device 210 is enabled (e.g., connected, turned on, or the like) for a portion of a network (e.g., an Ethernet segment, an EVPN instance, etc.), and may be triggered to exchange the messages. Additionally, or alternatively, network device 210 may be triggered to exchange the messages based on determining that another network device 210 is enabled, disabled, or the like. For example, based on receiving a message (e.g., a BGP message) indicating that a particular network device 210 is enabled, disabled, or the like, network device 210 may determine to exchange the messages (e.g., with one or more other network devices 210). In some implementations, network device 210 may be triggered to exchange the messages periodically. For example, after a threshold amount of time, network device 210 may determine that network device 210 is to exchange the messages.

In some implementations, network device 210 may be triggered to exchange one or more BGP messages. For example, network device 210 may be configured to transmit information regarding routing of network traffic via one or more BGP messages. In this case, network device 210 may be configured to include a portion of the information regarding routing of network traffic via extended community portions of the one or more BGP messages. In some implementations, network device 210 may be triggered to exchange the messages with a particular one or more network devices 210. For example, a first network device 210 may be triggered to transmit a first message to a second network device 210, and the second network device 210 may be concurrently triggered to transmit a second message to the first network device 210.

In some implementations, a first network device 210 and a second network device 210 may be separately triggered. For example, first network device 210 may be triggered to transmit a first message associated with causing a designated forwarder election procedure to be performed without being triggered to receive a message and without second network device 210 being triggered to transmit and/or receive one or more messages. In this case, second network device 210 may separately detect a trigger to transmit a second message associated with causing the designated forwarder election procedure to be performed, and first network device 210 and second network device 210 may be triggered to receive the first message and the second message, respectively, based on respective transmissions of the first message and the second message.

As further shown in FIG. 4, process 400 may include exchanging messages with the one or more other network devices based on detecting the trigger (block 420). For example, network device 210 may exchange messages with the one or more other network devices 210 based on detecting the trigger. In some implementations, network device 210 may transmit a message to the one or more other network devices 210. For example, based on detecting the trigger, network device 210 may generate a BGP message, and may transmit the message to one or more network devices 210 sharing a common portion of a network (e.g., a common Ethernet segment, a common EVPN instance, or the like). Additionally, or alternatively, network device 210 may receive a message from the one or more other network devices 210 sharing the common portion of the network. For example, another network device 210 sharing the common portion of the network may generate a BGP message (e.g., based on detecting a trigger to exchange messages), and may transmit the message to network device 210. In some implementations, network device 210 may identify the one or more other network devices 210 sharing the common portion of the network. For example, network device 210 may receive a message identifying a portion of a network topology, and may determine that the one or more other network devices 210 share the common portion of the network based on the message. Additionally, or alternatively, network device 210 may utilize stored configuration information to determine that the other one or more network devices 210 share the common portion of the network. Additionally, or alternatively, network device 210 may transmit a message to a set of network devices 210 that include the one or more other network devices 210, and the one or more other network devices 210 may determine to utilize the message based on information identifying network device 210 and/or the common portion of the network.

In some implementations, network device 210 may include information indicating that network device 210 is configured to perform a static designated forwarder election procedure in a message exchanged with another network device 210. For example, network device 210 may store information identifying a static designated forwarder election configuration (e.g., information indicating that network device 210 is configured as a designated/non-designated forwarder for one or more portions of a network) based on being configured with the static designated forwarder election configuration. In this case, network device 210 may generate an extended community portion of a BGP message that indicates that network device 210 is configured to perform the static designated forwarder election procedure. In some implementations, network device 210 may include the extended community in a message that includes information identifying an Ethernet segment route (type 4) (e.g., an Ethernet segment route indicating that a router identifier value for a particular Ethernet segment identifier (ESI) can be auto-generated or statically configured). In this way, network device 210 indicates that network device 210 is capable of performing a static designated forwarder election procedure, thereby triggering one or more other network devices 210 to perform the static designated forwarder election procedure if the one or more other network devices 210 are also configured to perform the static designated forwarder election procedure.

In some implementations, network device 210 may include information identifying a forwarder role in a message exchanged with another network device 210. For example, network device 210 may determine (e.g., based on a stored static designated forwarder configuration) a designated forwarder role for network device 210 for a portion of a network (e.g., whether network device 210 is a designated forwarder for a particular Ethernet segment and a particular EVPN instance, whether network device 210 is a non-designated forwarder for the particular Ethernet segment and the particular EVPN instance, or the like). In this case, network device 210 may generate an extended community portion of a BGP message (e.g., a BGP message identifying an Ethernet auto-discovery (A-D) route) that identifies the designated forwarder role for network device 210. In this way, network device 210 reduces a likelihood that an erroneous static designated forwarder configuration causes multiple network devices 210 to utilize the static designated forwarder election procedure to select multiple different network devices 210 or fail to select any network device 210 as a designated forwarder for a particular Ethernet segment and a particular EVPN instance.

In some implementations, network device 210 may receive a message that includes information identifying a designated forwarder election procedure or a designated forwarder role. For example, network device 210 may receive a message, of the exchanged messages, that includes an extended community indicating that another network device 210 is configured to utilize the static designated forwarder election procedure. Similarly, network device 210 may receive a message (e.g., the same message, another message, etc.), of the exchanged messages, that includes an extended community indicating that the other network device 210 is associated with a particular designated forwarder role. In this way, network device 210 is triggered to perform the static designated forwarder election procedure, and utilize the information identifying the particular designated forwarder role of the other network device 210 to avoid an erroneous designated forwarder election. Additionally, or alternatively, network device 210 may receive a message that includes information identifying another designated forwarder election procedure or that fails to identify a designated forwarder election procedure. In this case, network device 210 may be triggered to perform another designated forwarder election procedure.

As further shown in FIG. 4, process 400 may include selectively performing a static designated forwarder election procedure based on exchanging the messages with the one or more other network devices (block 430). For example, network device 210 may selectively perform the static designated forwarder election procedure based on exchanging the messages with the one or more network devices. In some implementations, network device 210 may perform the static designated forwarder election procedure based on receiving a message indicating that another network device 210 is configured to perform the static designated forwarder election procedure. For example, for a particular portion of a network (e.g., a particular Ethernet segment and a particular EVPN instance), network device 210 may determine, based on exchanging messages with one or more network devices 210, that each of the one or more network devices 210 is configured to perform the static designated forwarder election procedure. In this case, network device 210 may perform the static designated forwarder election procedure based on determining that each of the one or more network devices 210 is configured to perform the static designated forwarder election procedure. Moreover, each of the one or more network devices 210 may similarly perform the static designated forwarder election procedure based on exchanging the one or more messages and determining that network device 210 and the one or more network devices 210 are each configured to perform the static designated forwarder election procedure.

In some implementations, network device 210 may utilize stored information to perform the static designated forwarder election procedure. For example, when network device 210 stores a static designated forwarder configuration identifying a designated forwarder role for network device 210 for a particular portion of a network, network device 210 may enable the designated forwarder role (e.g., network device 210 may act as designated forwarder for the portion of the network and may forward multicast packets, network device 210 may act as a non-designated forwarder for the portion of the network and may fail to forward multicast packets, or the like).

In some implementations, network device 210 may utilize another designated forwarder election procedure (e.g., a non-static designated forwarder election procedure) based on exchanging the messages. For example, when network device 210 determines that a particular network device 210 associated with a common portion of a network (e.g., a common Ethernet segment and EVPN instance) is not configured to perform the static designated forwarder election procedure, network device 210 may perform a dynamic designated forwarder election procedure. In this way, network device 210 maintains compatibility with legacy network devices 210 not configured to perform the static designated forwarder election procedure by performing a legacy designated forwarder election procedure (e.g., the dynamic designated forwarder procedure) when any network device 210 of a common portion of a network is not configured to perform the static designated forwarder election procedure.

As further shown in FIG. 4, process 400 may include performing routing of network traffic based on selectively performing the static designated forwarder election procedure (block 440). For example, network device 210 may route the network traffic based on selectively performing the static designated forwarder election procedure. In some implementations, network device 210 may perform designated forwarder routing. For example, based on selecting a designated forwarder role when selectively performing the static designated forwarder election procedure, network device 210 may perform multicast packet routing. Additionally, or alternatively, based on selecting a non-designated forwarder role, network device 210 may fail to perform multicast packet routing.

In some implementations, network device 210 may advertise a designated forwarder role when routing network traffic. For example, when network device 210 determines that network device 210 is to be the designated forwarder for a particular Ethernet segment and EVPN instance, network device 210 may transmit an extended community when advertising an auto-discovery (A-D) route to indicate that network device 210 is a designated forwarder associated with the A-D route. In this way, when a failure is detected with network device 210 (e.g., a route is withdrawn), a non-designated forwarder for the Ethernet segment and EVPN instance (e.g., another network device 210) may switch to the designated forwarder role for the Ethernet segment and the EVPN instance. In this way, network device 210 reduces a likelihood of a failure causing no network device 210 to perform the designated forwarder role, thereby improving network performance relative to failing to transmit an indication of the designated forwarder role. Similarly, when network device 210 is a non-designated forwarder and detects a route being withdrawn by a designated forwarder (e.g., another network device 210 transmitting an extended community identifying the designated forwarder role of the other network device 210 when withdrawing the route), network device 210 may switch from the non-designated forwarder role to the designated forwarder role for the Ethernet segment and the EVPN instance associated with the route.

In some implementations, network device 210 may advertise the designated forwarder role when recovering from a failure. For example, when a failure condition for an Ethernet segment is resolved, network device 210 may advertise a route for the recovered Ethernet segment that indicates a non-designated forwarder role (e.g., based on another network device 210 becoming designated forwarder after the failure), and may start a first timer associated with the recovered Ethernet segment. After the first timer exceeds a threshold period of time, network device 210 may advertise the route with an extended community indicating a designated forwarder role to cause the other network device 210 to return to a non-designated forwarder role, and may start a second timer. After the second timer exceeds a threshold period of time, network device 210 may switch to being designated forwarder for the Ethernet segment. Based on utilizing the first timer, network device 210 reduces a likelihood that a repeated failure and recovery causes excessive designated forwarder role switching, thereby reducing a quantity of network messages transmitted and improving network performance relative to failure recovery without utilizing the first timer. Based on utilizing the second timer, network device 210 reduces a likelihood that both the network device 210 and the other network device 210 concurrently act as designated forwarder, thereby reducing a likelihood of a network error and improving network performance relative to failure recovery without the second timer.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, network device 210 may reduce a quantity of processing and network resources associated with performing a designated forwarder election procedure relative to performing a dynamic designated forwarder election procedure. Moreover, network device 210 may improve network management based on increasing a likelihood that a user can determine which network device 210 is to become designated forwarder and/or is acting as designated forwarder for a portion of a network.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
transmit, to one or more network devices of a particular portion of a network, information indicating that the device is configured to perform a static designated forwarder election procedure;
determine, based on transmitting the information, whether each of the one or more network devices of the particular portion of the network are configured to perform the static designated forwarder election procedure; and
selectively enable a static designated forwarder role or a dynamic designated forwarder role of the device, for the particular portion of the network, based on determining whether each of the one or more network devices of the particular portion of the network are configured to perform the static designated forwarder election procedure,
the static designated forwarder role being enabled based on each of the one or more network devices of the particular portion of the network being configured to perform the static designated forwarder election procedure, or
the dynamic designated forwarder role being enabled based on one of the one or more network devices, of the particular portion of the network, not being configured to perform the static designated forwarder election procedure.

2. The device of claim 1, where the one or more processors are further to:
route network traffic based on enabling the static designated forwarder role.

3. The device of claim 1, where the one or more processors are further to:
receive, from the one or more network devices, one or more messages indicating that the one or more network devices are configured to perform the static designated forwarder election procedure; and
where the one or more processors, when determining whether each of the one or more network devices of the particular portion of the network are configured to perform the static designated forwarder election procedure, are to:
determine that each of the one or more network devices of the particular portion of the network are configured to perform the static designated forwarder election procedure based on receiving the one or more messages.

4. The device of claim 1, where the one or more processors are further to:
generate a border gateway protocol message including an extended community portion,
the extended community portion including information indicating that the device is configured to perform the static designated forwarder election procedure; and
where the one or more processors, when transmitting the information indicating that the device is configured to perform the static designated forwarder election procedure, are to:
transmit the border gateway protocol message to the one or more network devices.

5. The device of claim 1, where the one or more processors, when transmitting the information indicating that the device is configured to perform the static designated forwarder election procedure, are to:
transmit the information indicating that the device is configured to perform the static designated forwarder election procedure to cause the one or more network devices to perform the static designated forwarder election procedure.

6. The device of claim 1, where the one or more processors are further to:
transmit, to another one or more network devices of another portion of the network, information indicating that the device is configured to perform the static designated forwarder election procedure;
determine that a particular network device, of the other one or more network devices of the other portion of the network, is not configured to perform the static designated forwarder election procedure; and
perform another designated forwarder election procedure based on determining that the particular network device is not configured to perform the static designated forwarder election procedure,
the other designated forwarder election procedure being different from the static designated forwarder election procedure.

7. The device of claim 1, where the particular portion of the network is a particular Ethernet segment and a particular Ethernet virtual private network instance.

8. A non-transitory computer-readable medium storing instructions, the instructions comprising:
one or more instructions that, when executed by one or more processors of a device, cause the one or more processors to:
determine whether each network device, of a particular portion of a network, is configured to perform a static designated forwarder election procedure to select a designated forwarder for the particular portion of the network; and
selectively perform the static designated forwarder election procedure or a dynamic designated forwarder election procedure, for the particular portion of the network, to select the designated forwarder for the particular portion of the network based on determining whether each network device, of the particular portion of the network, is configured to perform the static designated forwarder election procedure,
the static designated forwarder election procedure being performed based on each network device of the particular portion of the network being configured to perform the static designated forwarder election procedure, or
the dynamic designated forwarder election procedure being performed based on one or more network device, of the particular portion of the network, not being configured to perform the static designated forwarder election procedure.

9. The non-transitory computer-readable medium of claim 8, where the device is selected as a non-designated forwarder role for the particular portion of the network and another device is selected as a designated forwarder role for the particular portion of the network; and
where the one or more instructions, when executed by the one or more processors, further cause the one or more processors to:
detect a failure associated with the other device; and
switch to the designated forwarder role for the particular portion of the network based on detecting the failure associated with the other device.

10. The non-transitory computer-readable medium of claim 9, where the one or more instructions, when executed by the one or more processors, further cause the one or more processors to:
receive information indicating a recovery from the failure; and
switch to the non-designated forwarder role for the particular portion of the network based on detecting the recovery from the failure.

11. The non-transitory computer-readable medium of claim 8, where the device is selected as a designated forwarder role for the particular portion of the network and another device is selected as a non-designated forwarder role for the particular portion of the network; and
where the one or more instructions, when executed by the one or more processors, further cause the one or more processors to:
detect a failure for the particular portion of the network;
detect a recovery for the particular portion of the network after detecting the failure for the particular portion of the network; and
switch to the non-designated forwarder role for the particular portion of the network based on detecting the recovery for the particular portion of the network after detecting the failure for the particular portion of the network,
the other device having switched to the designated forwarder role for the particular portion of the network.

12. The non-transitory computer-readable medium of claim 11, where the one or more instructions, when executed by the one or more processors, further cause the one or more processors to:
determine that a first threshold period of time has elapsed from detecting the recovery for the particular portion of the network;
transmit, to the other device, information indicating that the device is to switch to the designated forwarder role from the non-designated forwarder role based on determining that the first threshold period of time has elapsed from detecting the recovery for the particular portion of the network;
determine that a second threshold period of time has elapsed from transmitting the information indicating that the device is to switch to the designated forwarder role; and switch to the designated forwarder role based on determining that the second threshold period of time has elapsed.

13. The non-transitory computer-readable medium of claim 8, where the one or more instructions, when executed by the one or more processors, further cause the one or more processors to:
receive a set of messages from each network device, of the particular portion of the network, indicating that each network device, of the particular portion of the network, is configured to perform the static designated forwarder election procedure; and
where the one or more instructions, that cause the one or more processors to determine whether each network device is configured to perform the static designated forwarder election procedure, cause the one or more processors to:
determine that each network device is configured to perform the static designated forwarder election procedure based on receiving the set of messages.

14. The non-transitory computer-readable medium of claim 8, where the one or more instructions, when executed by the one or more processors, further cause the one or more processors to:
transmit a set of messages to each network device, of the particular portion of the network, indicating that the device is configured to perform the static designated forwarder election procedure,
the set of messages being associated with causing each network device, of the particular portion of the network, to perform the static designated forwarder election procedure.

15. A method, comprising:
detecting, by a device, a trigger to exchange one or more messages with another device;
exchanging, by the device, the one or more messages with the other device based on detecting the trigger to exchange the one or more messages with the other device;
selectively performing, by the device, a static designated forwarder election procedure or a dynamic designated forwarder election procedure based on exchanging the one or more messages with the other device,
the static designated forwarder election procedure being performed based on the device and the other device being configured to perform the static designated forwarder election procedure, or
the dynamic designated forwarder election procedure being performed based on one of the device or the other device not being configured to perform the static designated forwarder election procedure; and
performing, by the device, routing of network traffic based on selectively performing the static designated forwarder election procedure.

16. The method of claim 15, where exchanging the one or more messages with the other device comprises:
transmitting a message, of the one or more messages, to the other device,
the message indicating that the device is configured to perform the static designated forwarder election procedure, and
the message being associated with causing the other device to perform the static designated forwarder election procedure.

17. The method of claim 15, where exchanging the one or more messages with the other device comprises:
receiving a message, of the one or more messages, from the other device indicating that the other device is configured to perform the static designated forwarder election procedure; and
where selectively performing the static designated forwarder election procedure or the dynamic designated forwarder election procedure comprises:
performing the static designated forwarder election procedure based on receiving the message from the other device indicating that the other device is configured to perform the static designated forwarder election procedure.

18. The method of claim 15, further comprising:
failing to receive, from the other device, a message, of the one or more messages, indicating that the other device is configured to perform the static designated forwarder election procedure; and
where selectively performing the static designated forwarder election procedure or the dynamic designated forwarder election procedure comprises:
performing the dynamic designated forwarder election procedure based on failing to receive the message indicating that the other device is configured to perform the static designated forwarder election procedure.

19. The method of claim 15, where the one or more messages are one or more border gateway protocol messages including a corresponding one or more extended community portions,
the one or more extended community portions indicating that the device and the other device are configured to perform the static designated forwarder election procedure.

20. The method of claim 15, where performing the static designated forwarder election procedure comprises:
enabling a particular designated forwarder role,
the particular designated forwarder role being a designated forwarder role or a non-designated forwarder role; and
where performing the routing of the network traffic comprises:
performing the routing of the network traffic based on the particular designated forwarder role.

* * * * *